United States Patent [19]

Okayasu et al.

[11] Patent Number: 5,189,520

[45] Date of Patent: Feb. 23, 1993

[54] VIDEO CAMERA MODULAR ACCESSORY APPARATUS

[75] Inventors: Yoshisada Okayasu; Toshiyuki Yamauchi, both of Kanagawa; Akinari Mori; Naoki Kamaya, both of Tokyo; Naoki Okayama, Kanagawa; Takanori Maruichi, Chiba; Junichi Iwasawa; Yukio Yamada, both of Kanagawa; Renjiro Okano, Chiba, all of Japan

[73] Assignee: Sony Corporation, Tokyo, Japan

[21] Appl. No.: 660,786

[22] Filed: Feb. 25, 1991

[30] Foreign Application Priority Data

Feb. 26, 1990 [JP] Japan ............................ 2-44941
Feb. 26, 1990 [JP] Japan ............................ 2-44942
Feb. 26, 1990 [JP] Japan ............................ 2-44943

[51] Int. Cl.$^5$ .................... H04N 5/30; H04N 5/225
[52] U.S. Cl. ................................ 358/229; 358/209; 358/909; 358/906; 354/295; 354/484
[58] Field of Search ............... 358/229, 209, 906, 909, 358/254; 354/295, 484, 288, 75, 76; 352/243; 455/349

[56] References Cited

U.S. PATENT DOCUMENTS

| 4,470,077 | 9/1984 | Komine | 358/229 |
|---|---|---|---|
| 4,764,817 | 8/1988 | Blazek et al. | 358/909 |
| 4,924,246 | 5/1990 | Yamada | 358/906 |
| 4,945,424 | 7/1990 | Hiroki | 358/906 |
| 4,969,046 | 11/1990 | Sugimoto | 358/229 |
| 5,068,683 | 11/1991 | Miyazaki | 358/906 |
| 5,121,147 | 6/1992 | Wada | 354/81 |

FOREIGN PATENT DOCUMENTS 2183936A 6/1987 United Kingdom .
2184897A 7/1987 United Kingdom .
2238624A 6/1991 United Kingdom .

OTHER PUBLICATIONS

Patent Abstracts of Japan, vol. 15, No. 108 (E-1045)14 Mar. 1991 and JP-A-2 312 450 (Victor Company of Japan, Ltd.) Dec. 27, 1990.
Patent Abstracts of Japan, vol. 11, No. 396 (E-568) (2843) Dec. 24, 1987 and JP-A-62 159 578 (Matsushita Electric Industrial Co. Ltd.).

Primary Examiner—James J. Groody
Assistant Examiner—Sherrie Hsia
Attorney, Agent, or Firm—Philip M. Shaw, Jr.

[57] ABSTRACT

An adapter pack is constructed so that it can be connected to a video camera via the site via which the battery pack is normally connected. The adapter pack is itself provided with a mounting site on which the battery pack can be connected. This construction allows the adapter pack to be operatively "sandwiched" between the battery pack and the camera. The adapter pack is arranged to permit the power from the battery pack to be supplied both to its own circuitry and therethrough to the camera.

4 Claims, 14 Drawing Sheets

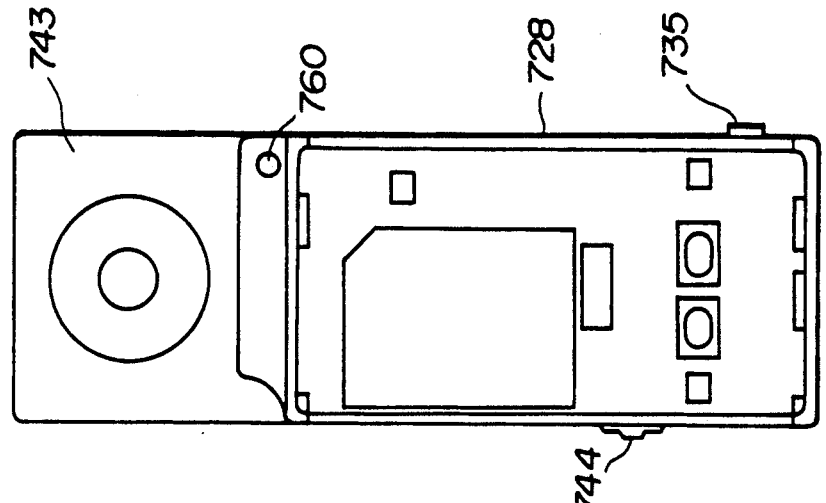
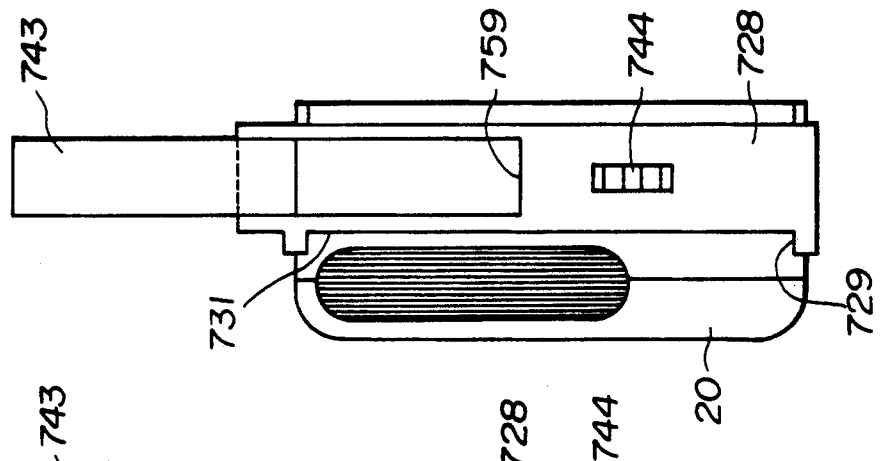
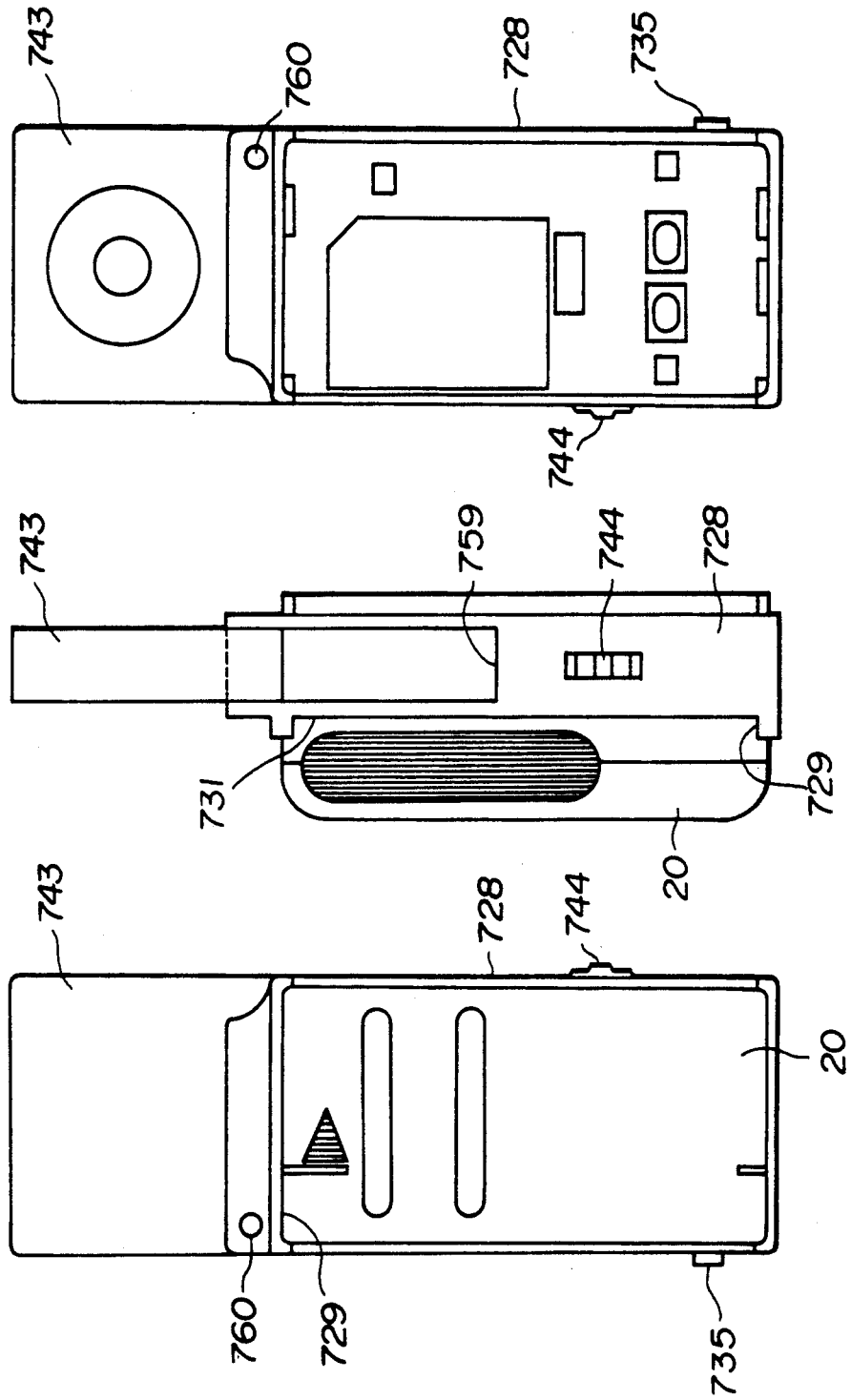

VIDEO CAMERA MODULAR ACCESSORY APPARATUS

BACKGROUND OF THE INVENTION

1. Field of the Invention

The present invention relates generally to a hand held VTR type video camera of the type wherein an optical image is converted into electrical signals and recorded on a magnetic tape in a tape cassette, and more specifically to a video camera which allows one or more packs to be readily coupled therewith.

2. Description of the Prior Art

Hand held cameras of the type wherein images which have passed through an optical lens system are converted into electrical video signals by way of a CCD and recorded on the magnetic tape in a cassette which is operatively disposed within the camera body, are now in common use.

However, in order to reduce the size and weight of these type of devices, TV tuners are not included. Therefore, the VTR systems which are included in the video cameras cannot pick up and record TV broadcasts. To this end it is necessary to connect the camera with a TV tuner with a cable and to supply an image signal from the tuner to the VTR in the camera.

Normally, TV tuners require connection with a suitable household type of power source and thus cannot be taken outdoors for the purpose of recording a TV broadcast. Further, not all cameras can be connected to a television set by the same type of cable. In addition the cable limits the degree to which the camera can be moved and tends to destroy its portability.

A further drawback which tends to be encountered with current types of portable hand-held video cameras stems from the fact that it is often desired to use a mike mixing device to simultaneously record a sound track so as to enable background music or narration.

In order to achieve this simultaneous recording an FM tuner/mike mixing adapter has been proposed. This adapter is connected to the video camera by way of an accessory shoe. This shoe is such as to have a single seat portion and thus able to provide only a single connection at any one time.

However, there is a tendency to omit the shoe, not so much as to achieve the required lightweight/compactness but because the provision of the shoe itself tends to detract from the aesthetic appearance of the camera design. Nevertheless in the cases where such a shoe is provided, as only a single connection can be established at a time, it is not possible to establish a connection between the batteries which serve as the cameras power source, and the adapter pack must be provided with its own power source. In the case of an FM tuner pack the separate power source usually takes the form of a button battery or dry cells.

Another drawback which tends to be encountered with known conventional hand-held types of video cameras stems from the fact that, in order to achieve adequate illumination such as when recording indoors, some form of artificial lighting is required. In order to achieve this while maintaining maximum portability, it has been proposed to provide a light pack which includes a halogen lamp and which is connectable with the camera through an accessory shoe.

Again, if the accessory shoe is not provided, the light pack cannot be used, or if the shoe is provide and the light pack is connected to the same, it becomes impossible to connect a microphone or FM tuner. Further, it is again necessary to provide a second and separate power source for the light pack as the shoe cannot provide two connections at once.

SUMMARY OF THE INVENTION

It is an object of the present invention to eliminate the need to provide a design deteriorating shoe and to simultaneously enable the ready connection of one or more accessory packs to the camera in a manner which enables the accessory packs to be powered by the camera's power source.

It is a further object of the present invention to provide a video camera arrangement wherein one of the accessory pack can take the form of a TV receiver and thus enable the recording of TV broadcasts without encroaching on the portability of the video camera.

It is a further object of the present invention to provide a video camera arrangement wherein the power source is provided in the form of a battery pack which is connected to the camera by the same type of connection via which the accessory packs are connected, and wherein the rear of each of the accessory packs is provide with same type of connection site so that the battery pack can be removed, one or more accessory packs connected serially one after the other to the camera and the battery pack connected to the rear of the rearmost pack to form an operative and aesthetic "sandwich".

In brief, the above objects are achieved through an arrangement wherein an adapter pack is constructed so that it can be connected to a video camera via the site via which the battery pack is normally connected. The adapter pack is itself provided with a mounting site on which the battery pack can be connected. This costruction allows the adapter pack to be sandwiched between the battery pack and the camera. The adapter pack is arranged to permit the power from the battery pack to be supplied both to its own circuitry and therethrough to the camera.

More specifically, the present invention comes in a video camera arrangement which includes a cabinet in which a VTR system is housed and which has a first battery mounting site on which a battery pack can be connected and which features: an adaptor pack, the adapter pack being adapted for connection to the first battery mounting site, the adapter pack having a second mounting site on which the battery pack can be mounted, the adapter pack permitting electrical power from the battery pack mounted on the second mounting site to be supplied therethrough to the camera via the first mounting site in a manner wherein both the camera and the adapter pack can be operated on the single battery pack.

BRIEF DESCRIPTION OF THE DRAWINGS

The objects and features of the present invention will become clear as a description of several embodiments is made in conjunction with the appended drawings in which:

FIGS. 16–18 are front and side elevations of a sixth embodiment.

DETAILED DESCRIPTION OF THE PREFERRED EMBODIMENTS

Figure 1:
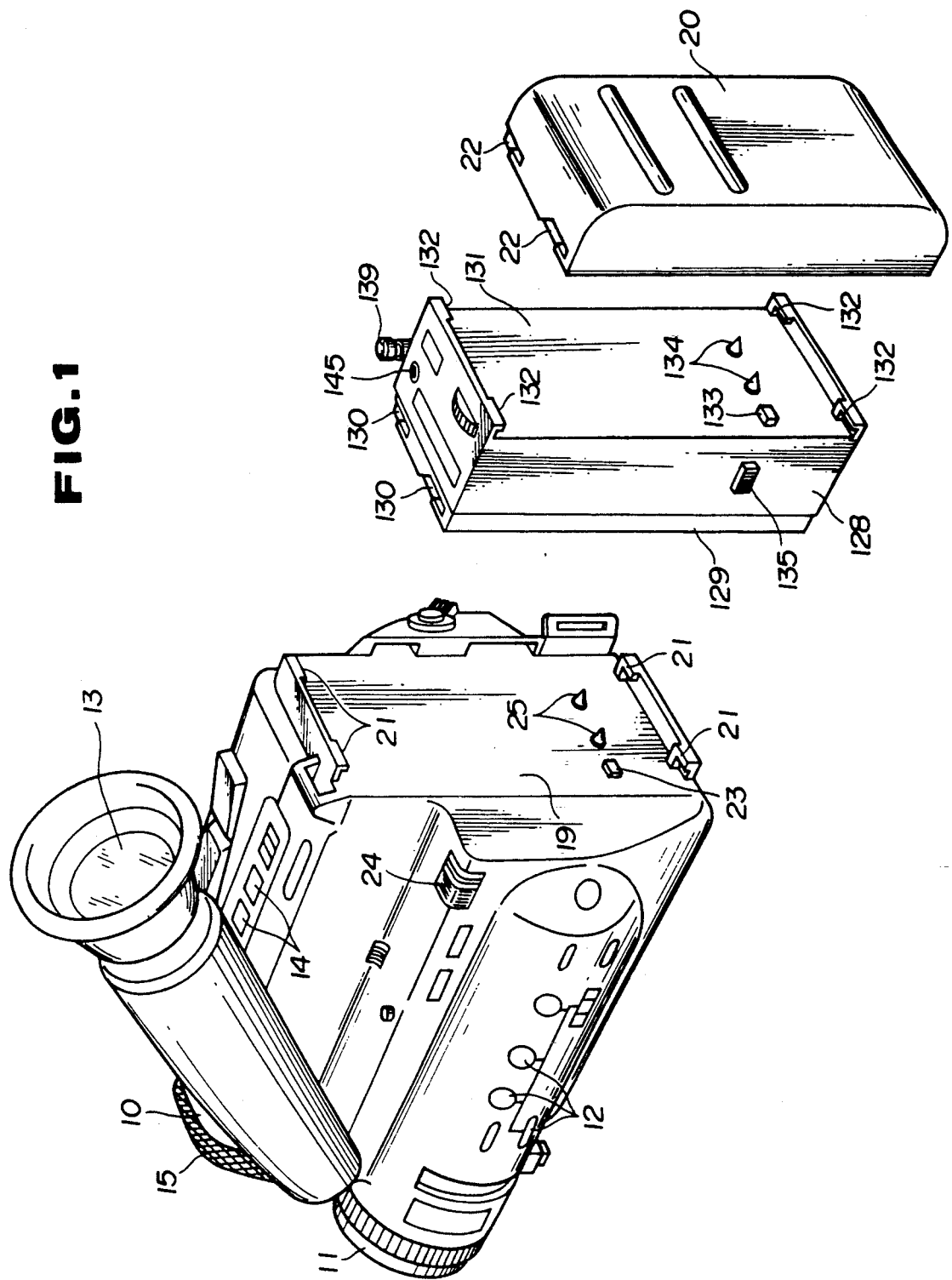
FIG. 1 is a perspective view showing a video camera, adapter pack (TV tuner) and battery pack according to a first embodiment of the present invention.
Figure 2:
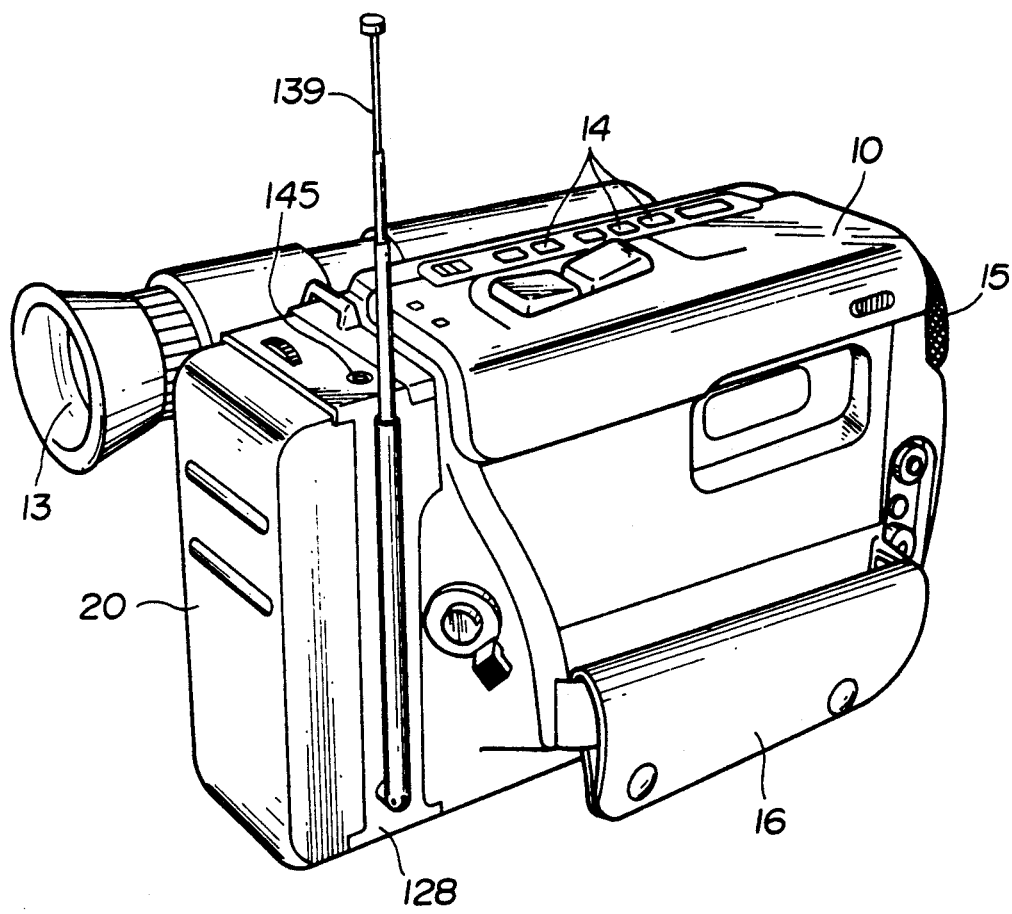
FIG. 2 is a perspective view showing the video camera, TV tuner adapter and battery packs assembled and ready for use.

FIGS. 1 and 2 show a first embodiment of the present invention. In this arrangement a cabinet 10 include a mirror tube 11 formed along its lower left side. This mirror tube contains an optical lens or lenses which serve to focus an image on a CCD or the like type of transducer. A plurality of camera control ports 12 are formed along the side of the mirror tube 11. A view finder 13 is pivotally supported on the cabinet in the illustrated manner. A plurality of video control ports are formed along the upper edge of the cabinet via which the VTR which is included in the camera can be controlled. A microphone 15 is disposed at the forward end of the cabinet while a grip belt 16 is provided on the right hand side thereof. This belt 16 allows the camera to be held in the right hand.

A battery mounting site 19 is provided along the rear edge of the cabinet 10. This mounting site permits a battery pack 20 be removably attached to the cabinet. The upper and lower edges of the mounting site 19 are formed with connection projections 21 which are respectively arranged to be slidably received in connection recesses 22 formed in upper and lower edges of the battery pack 20. A pack lock arrangement which is mounted in the cabinet 10, includes a slidable lock bolt 23 which can be moved via the manual operation of a release lever 24 which is disposed on the side of the cabinet 10 and which is operatively connected with the lock bolt 23.

A pair of contact pins 25 are arranged to project rearwardly from the face of the mounting site as shown in FIG. 1. These pins are arranged to engage in corresponding pack sockets to establish an electrical connection between the battery pack and the circuitry included in the cabinet.

In the arrangement illustrated in FIG. 1, a TV tuner adapter pack 128 is interposed between the battery pack 20 and the video camera cabinet 10. The front side of the TV tuner adapter pack 128 is provided with connection section 129 which is formed with connection recesses or slots 130 along the upper and lower edges in exactly the same manner as the battery pack 20. This arrangement allows the adapter pack to be connected to the mounting site 19 in exactly the same manner as the battery pack. The rear side of the adapter pack 128 is provided with a mounting site 131 which is identical to the one provided on the rear edge of the video camera cabinet. Viz., in this instance the rear edge of the TV tuner adapter pack is formed with connection projections 132 along the upper and lower edges which projections are designed to engage in the recesses 22 formed in the upper and lower edges of the battery pack 20.

As shown, mounting site 131 is also formed with contact pins 134 which are located in the same manner as those on the mounting site 19. A release bar 135 which is located on the side of the TV tuner adapter pack 128 is operatively connected with a lock bolt 133.

Figure 3:
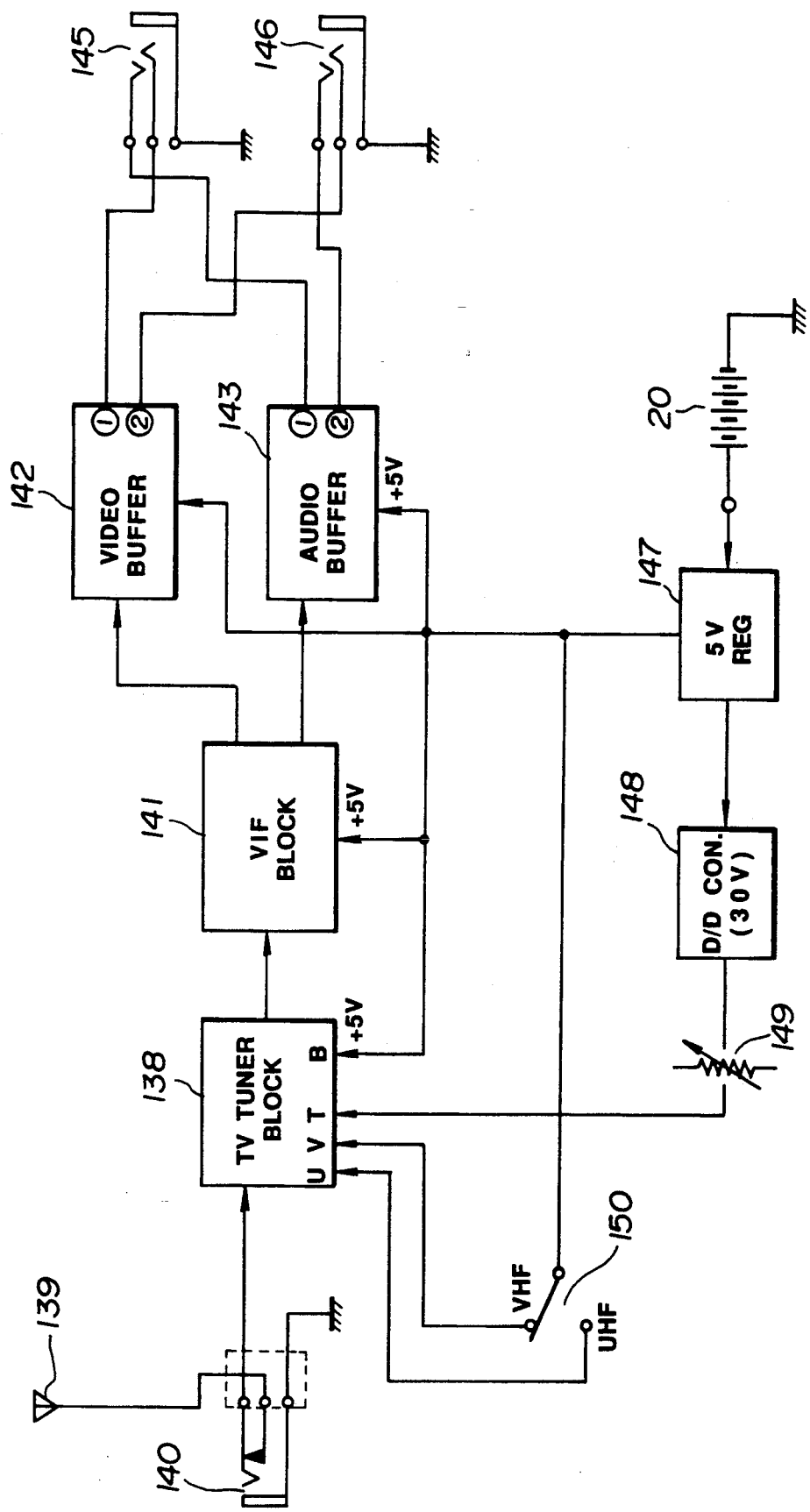
FIG. 3 is a circuit diagram showing the basic circuit arrangement of the TV tuner pack which forms part of the first embodiment.

FIG. 3 is a circuit diagram which shows the basic features of the circuitry of the TV tuner adapter pack 128. In this diagram 138 denotes tuner block which is connected with a rod antenna 139 and an external antenna connection jack 140. The TV tuner block is connected with a VIF block 141 which is in turn connected with a video buffer 142 and an audio buffer 143. The latter two mentioned buffers 142 and 143 are respectively connected with A/V output jacks 145 and 146.

The circuit further includes a voltage stabilizing circuit 147 and a direct current step up D/D converter 148. A tuning resistor 149 is circuited between the D/D converter and the tuner block 138 while a select switch 150 is circuited between the voltage stabilizing circuit 147 and the tuner block 138 and which is arranged to control the switching between VHF and UHF modes.

Figure 4:
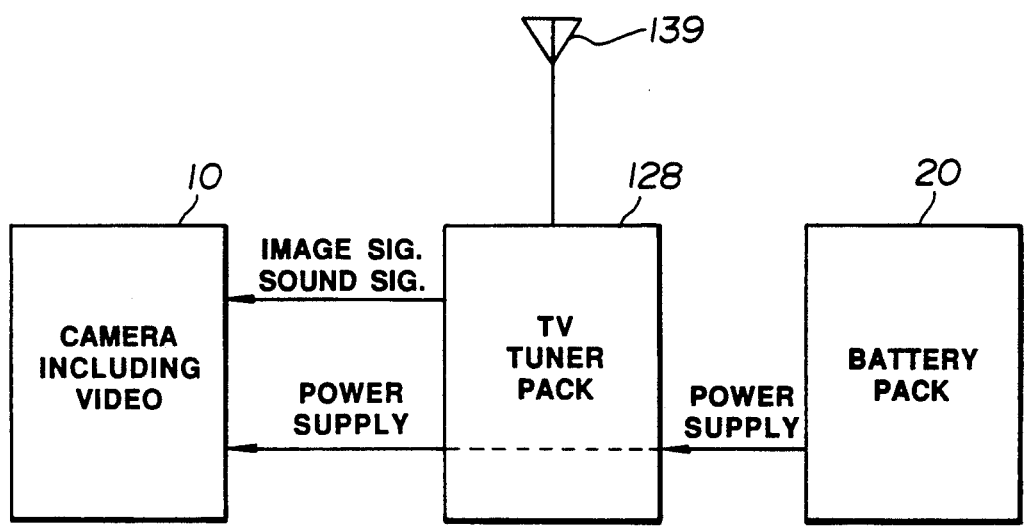
FIG. 4 is a block diagram showing the conceptual arrangement of the first embodiment wherein the TV tuner is used in combination with the camera and battery.
Figure 5:
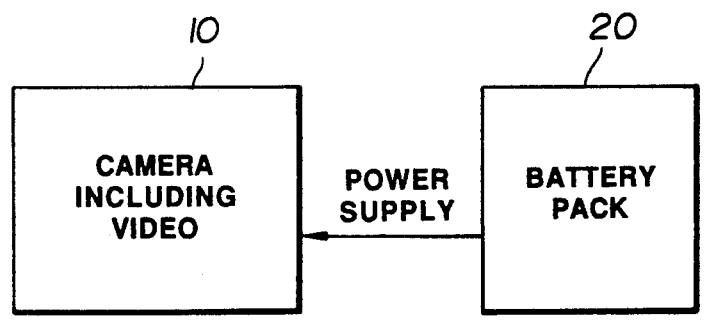
FIG. 5 is a block diagram showing the arrangement wherein an adapter pack is removed from the camera.

In the event that it is desired to record a TV broadcast on the tape in a tape cassette which is loaded into the video camera, the TV tuner pack 128 and the battery pack 20 are arranged in the manner schematically shown in FIG. 4. In this case the connection projections 21 of the video camera are engaged in the connection slots 130 while the lock bolt 23 engages in a suitable recess formed in the froont face of the TV tuner adapter pack 128. As will be appreciated as the guide projections and guide slots are laterally oriented and shaped such as to permit an adapter pack to be slid sideways in a manner which resembles a bayonet type connecting procedure, into an operative position, the provision of the lock bolts enable a simple and effective manner of locking the pack in question, in place.

In a similar manner the connection projections 132 are connected in the connection slots 22 of the battery pack 20, and the battery pack locked in place via projection of the lock bolt 133.

With the TV tuner adapter and battery packs locked in place, the contact pins 25, 134 provide an electric connection between the battery pack, the TV tuner adapter pack 128 and the video camera in a manner such that electrical power from the batteries contained in the battery pack can be supplied to both of the TV tuner adapter pack and the video camera which allows not only the video camera to be operated on the batteries but the TV tuner adapter pack as well. This of course eliminates the need for a separate power source for the TV tuner adapter pack and also eliminates the need to connect the video camera to a indoor type TV receiver. The broadcast which is received by the rod antenna 139 is supplied to the video camera in the form of a video or image signal and an audio or sound signal via the output jacks 145 and 146 shown in FIG. 3.

It should be noted that the jack 140 allows the rod antenna to be replaced by an externally supplied signal. The tuner block 138 is arranged to amplify the channel selected from the TV broadcast and to frequency convert the same about a center frequency of 58.75 MHz (video signal) or a center frequency of 54.25 MHz (audio signal).

The VIF block 141 amplifies the middle frequency signal from the tuner block 138 and at the same time a demodulation circuit separates the image and audio signals. Following this, the image signal is supplied to the video buffer 142 while the audio signal is supplied to the audio buffer 143. These signals are respectively supplied via the A/V jacks 145 and 146 to the plug sockets formed in the video camera body. The thus supplied signals can then be recorded on the magnetic tape contained in a tape cassette loaded into the video camera as desired.

SECOND EMBODIMENT

Figure 6:
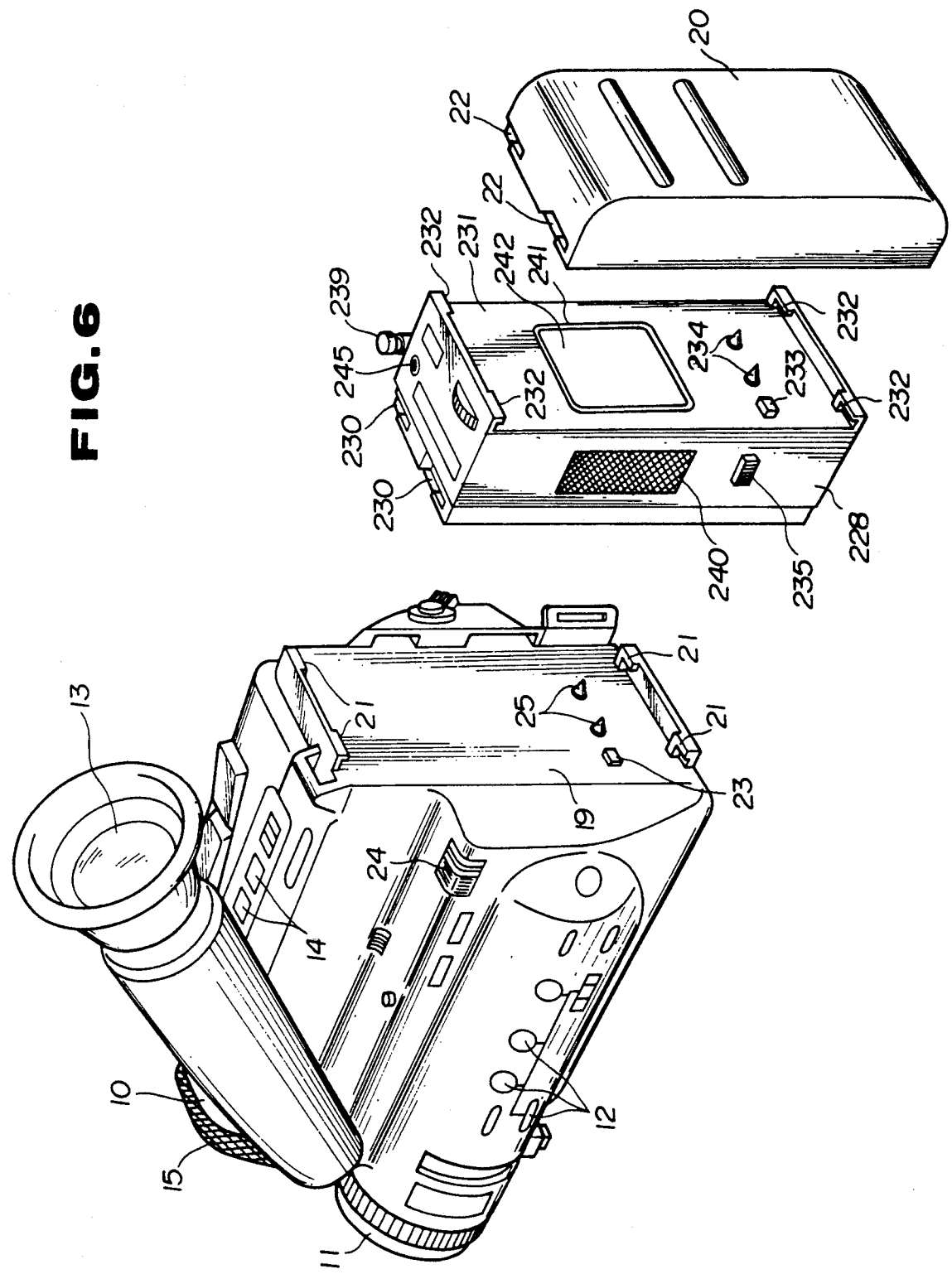
FIG. 6 is a perspective view showing a camera-adapter pack-battery pack arrangement which characterizes a second embodiment of the present invention.
Figure 7:
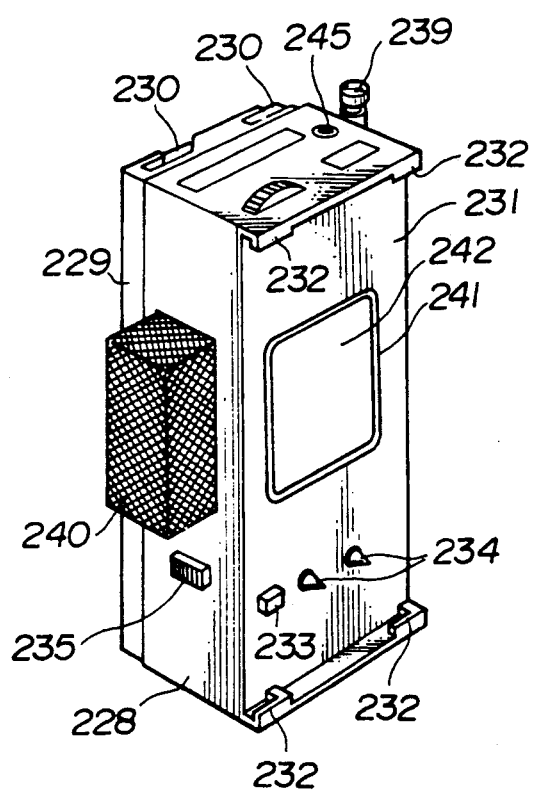
FIG. 7 is a perspective view showing an FM adapter pack which is used in the second embodiment with a microphone set in a projected state.
Figure 8:
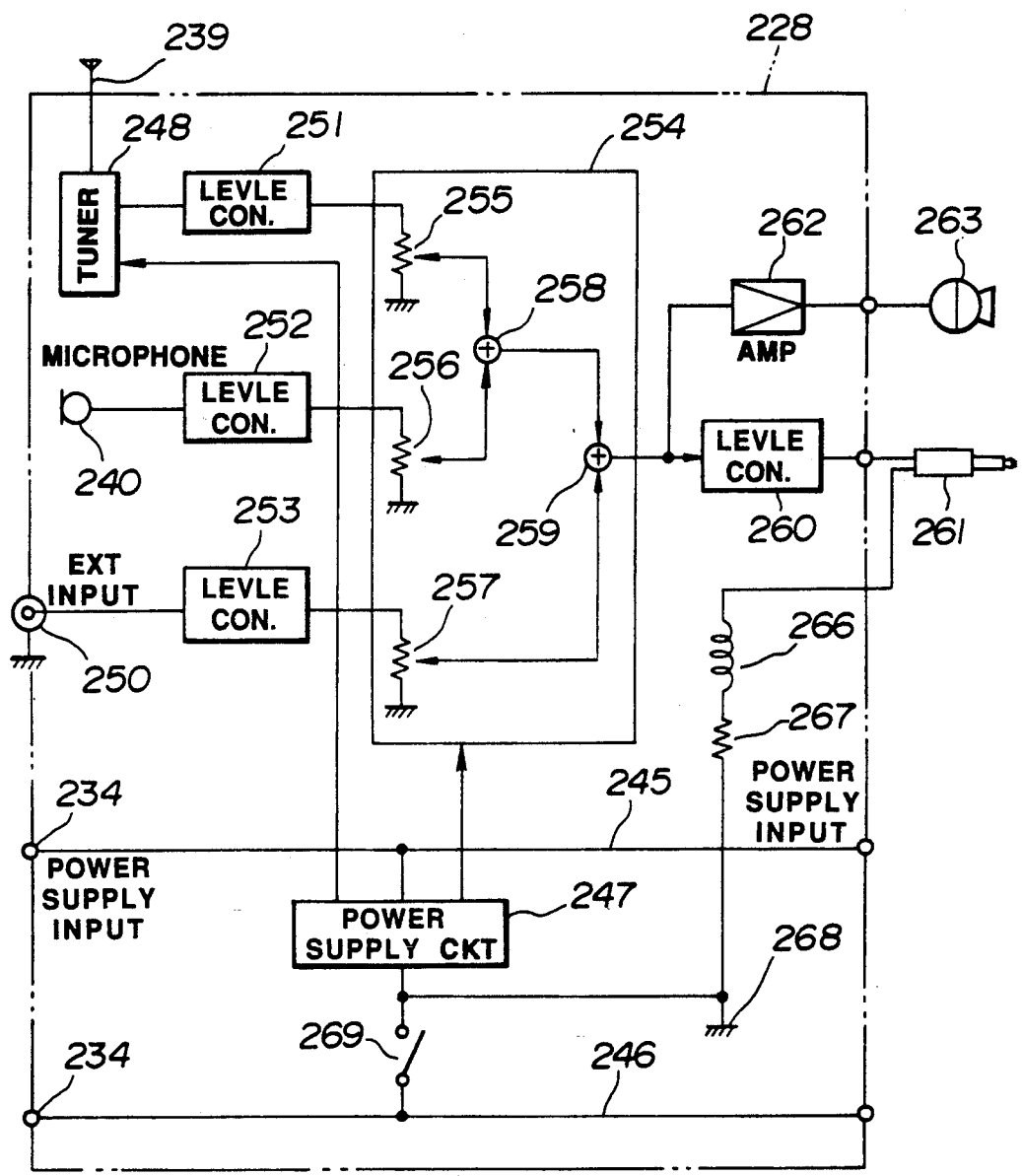
FIG. 8 is a circuit diagram showing the basic circuit arrangement of the FM adapter pack illustrated in FIGS. 6 and 7.
Figure 9:
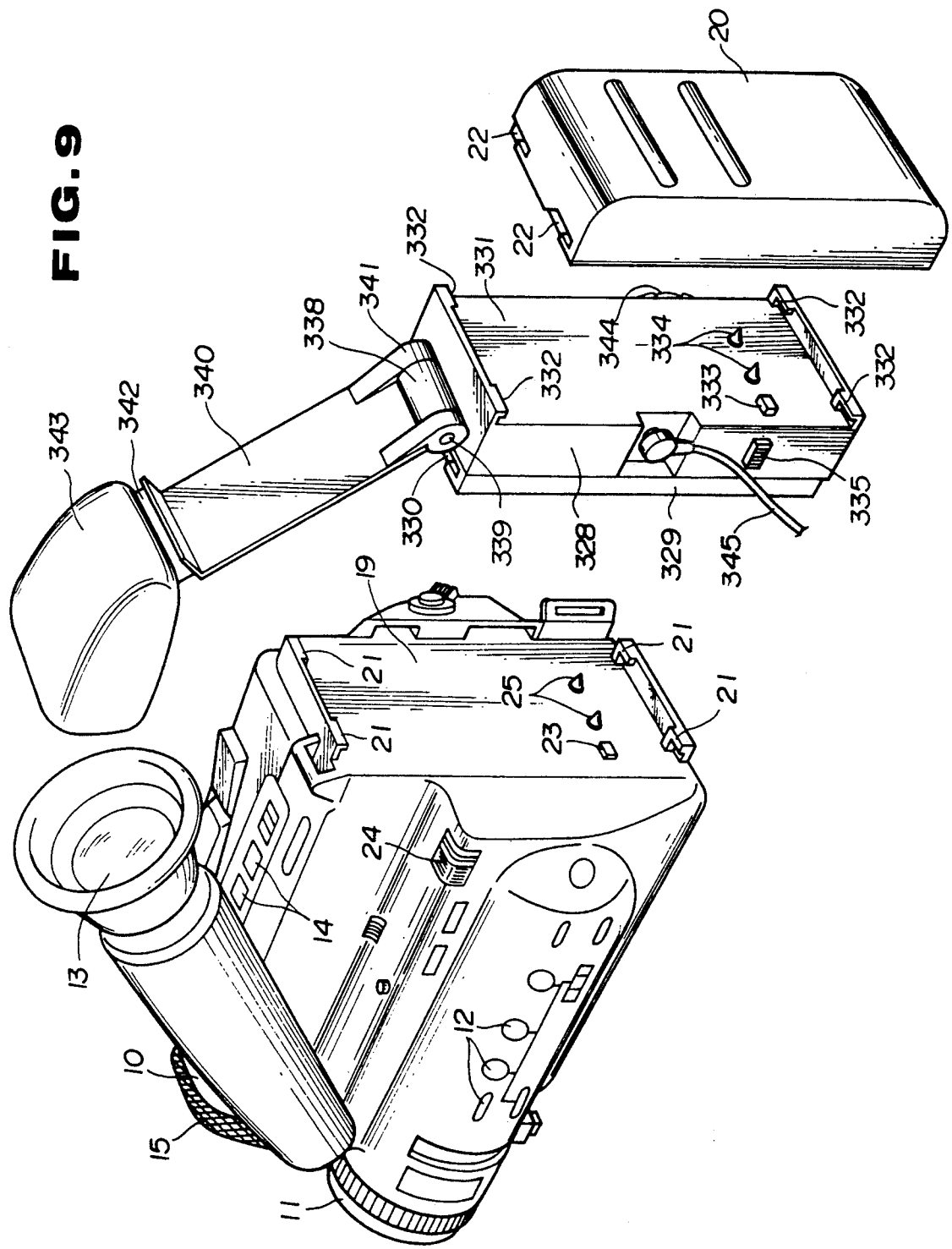
FIG. 9 is a perspective view showing a camera-light adapter pack-battery pack arrangement which characterizes a third embodiment of the present invention.
Figure 10:
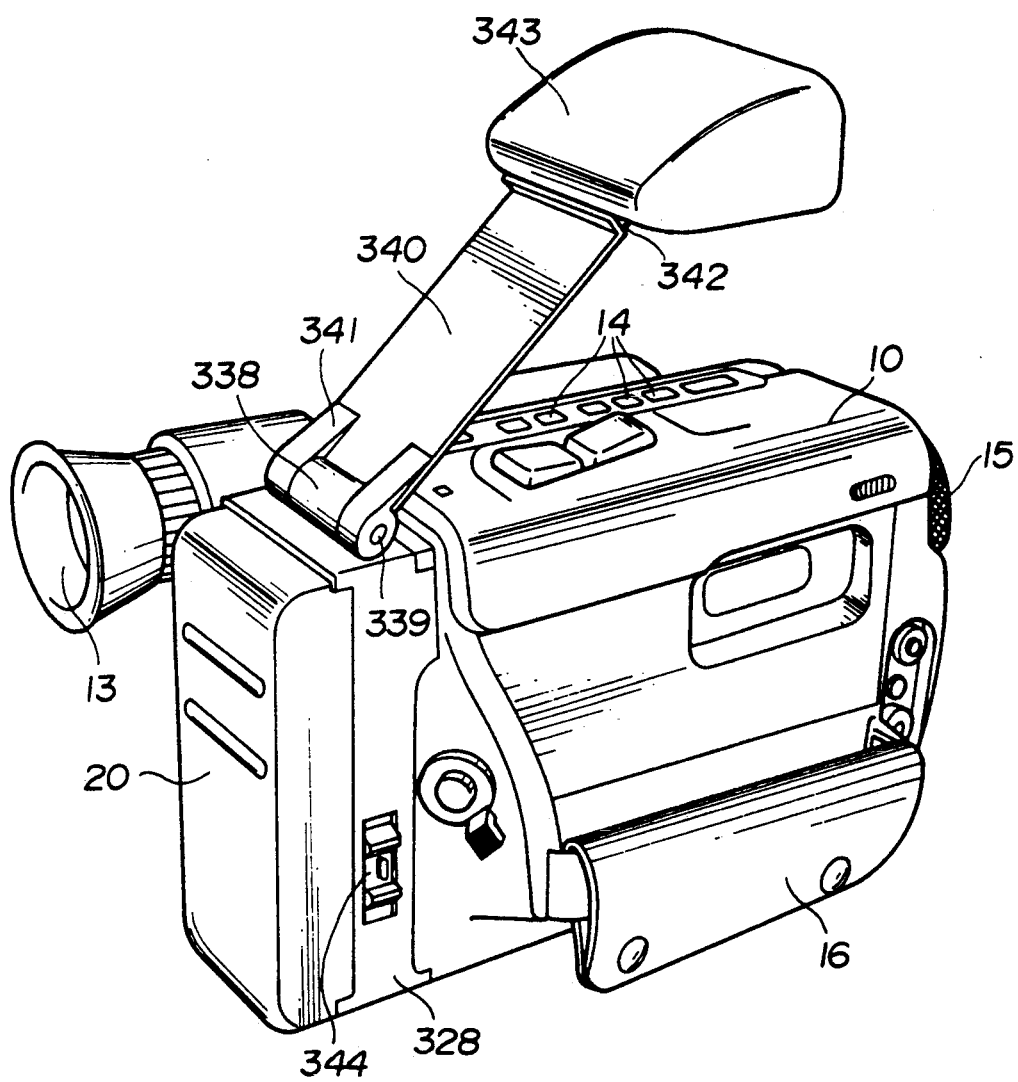
FIG. 10 is perspective view showing a camera and light adapter pack in a fully assembled condition.
Figure 11:
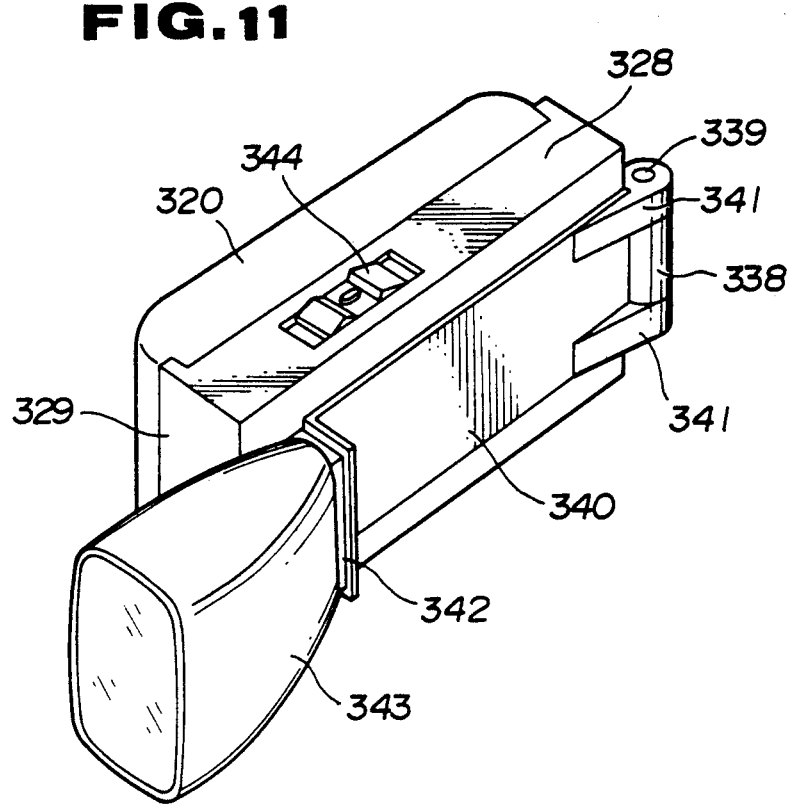
FIG. 11 is a perspective view showing the light and battery packs assembled together in a manner which enables their use as a torch.

FIGS. 6 to 8 show a second embodiment of the invention. In this embodiment the TV tuner adapter pack 128 is replaced with a FM tuner pack. As will be readily appreciated from FIG. 6, this FM tuner pack has essentially the same construction and arrangement as the adapter pack of the first embodiment. In this arrangement essentially the same set of numerals as used in connection with the first embodiment are used in connection with the instant one save that each has been incremented by 100. Viz., 128 becomes 228 and so on. Newly identified elements are a selectively extendible microphone 240, a receiving section 241 and a cover 242 which covers the just mentioned section.

FIG. 7 shows the microphone 240 in its extended position.

FIG. 8 shows an example of the circuitry which can be used in the FM tuner pack. In this diagram 245 and 246 denote power supply lines which are operatively connected with the plus and minus terminals of the battery pack 20 via contact pins 234. Lines 245 and 246 are connected with a power supply circuit 247 via which the tuner circuit is supplied with electrical power. Besides a tuner circuit 248, the microphone 240 and an external input jack 250 are arranged to supply input signals. Each of the tuner 248, the microphone 240, the external jack 250 are connected with level converter circuits 251, 252 and 253, respectively. The outputs of these three level converter circuits are supplied respectively to variable resistors 255, 256 and 257 which are included in an output mixing circuit 254. The outputs of the variable resistors 255 and 256 are supplied to an adder 258 while the output for the variable resistor 257 is supplied to an adder 259 along with the output of the adder 258. The output of the adder 259 is supplied by way of a level conversion circuit 260 to a microphone output pin 261. The output of the adder 259 is also supplied to an amplifier 262 which can be used to drive an earphone, headset or the like.

The negative terminal of the microphone output pin 261 (which is used to supply a sound signal to the video camera) is connected via a coil 266 and a fixed resistor 267. This impedance circuit is connected with ground 268 and with a switch 269. This switch 269 provides a selective connection between the power source line 246 and the power supply circuit 247.

When the FM adapter and batter packs are operatively connected to the video camera via the mounting site 19 (in the same manner as disclosed in connection with the TV tuner embodiment) both the camera and the FM tuner can be operated on the batteries contained in the battery pack 20. Viz., power from the battery pack 20 is supplied via the power supply lines 245, 256 to circuitry of the FM tuner and contact pins 25 of the camera.

The rod antenna 238 picks up the broadcast waves and according to the predetermined frequency which the tuner is arranged to select, a signal is supplied via the level control circuit 251 and the variable resistor 255 to the adder 258. In the case narration is input via the microphone 240, this signal is also supplied to the adder 258 via the level control circuit 252 and variable resistor 256. The combined signal is then supplied to the microphone output plug 261 and from this plug to the video camera wherein it can be recorded on the sound track of the cassette tape.

It will be noted that the FM tuner pack is provided with its own independent ground 268 which is connected to the minus terminal of the microphone output pin via an impedance circuit (#266, 267). As a result the ground level of the video camera and the ground level of the microphone input jack are rendered independent of one another and the influence of noise is prevented.

THIRD EMBODIMENT

FIGS. 9 to 12 show a third embodiment of the present invention. In this instance the adapter pack takes the form of an illumination adapter pack. Numerals which are used in connection with this embodiment are essentially the same as those used in connection with the first and second embodiments except the numerals which pertain the elements of the third embodiment are expressed in the 300's. Viz., the light pack becomes 328 etc. However, it should be noted that in this instance that: 338 and 339 denote a hinge and hinge pin via which a light support arm 340 is pivotally supported on the upper edge of the pack 328; 342 is a connection which supports a lamp 343 at the free end of the arm 340; 344 denotes a switch which is disposed on the right hand side of the pack and via which the light can be controlled; and 345 is a cable via which the light pack can be connected with a remote control jack on the video camera.

As will be appreciated from the figures, the hinge and the connection 342 allow the lamp 343 to be set at a number of different angles as required for indoor illumination.

Figure 12:
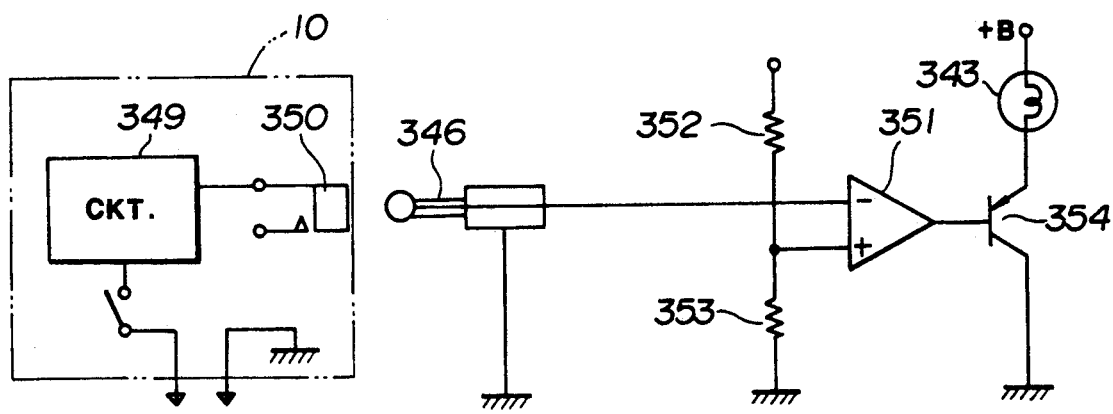
FIG. 12 is a circuit diagram showing an autoillumination circuit used in the light accessory pack illustrated in FIGS. 9 and 10.

The circuitry of the instant embodiment is illustrated in FIG. 12. In this figure 346 denotes a remote control connector plug which can be inserted into a jack 350 in the video camera. Jack 350 is connected with the main circuitry 349 of the camera. On the other hand, on the adapter pack side a comparator 351 has its non-inverting terminal (−) connected with the plug 346. The inverting input of the comparator is connected with a voltage divider comprised of fixed resistors 352 and 353. The output of the comparator 351 is connected with the base of a transistor 354 which controls the illumination of the lamp 343.

With this arrangement when the video camera is switched ON a voltage is applied to the comparator 351 via the jack 350 and the plug 346. In response the output of the comparator assumes a low level (0) and the transistor 354 is rendered conductive. As a result current can flow from the positive terminal B to earth via the lamp 343. On the other hand, when the power to the video camera is cut-off the output of the comparator 351 goes to a high level, the transistor 354 is rendered non-conductive and the lamp is extinguished. This allows the light to be switched ON/OFF simultaneously with the video camera.

Although not shown, it is possible to add a stopper to the hinge 338 in a manner which limits the angle to which the support arm 340 can be raised with respect to the light adapter pack.

It will noted that the the battery and light adapter packs can be used independently as a hand held flashlight or torch. In this case the support arm 340 can be folded flat against the the front face of the pack and the lamp 343 oriented at a suitable angle. Operation of the switch 344 controls the illumination of the lamp 343.

FOURTH EMBODIMENT

Figure 13:
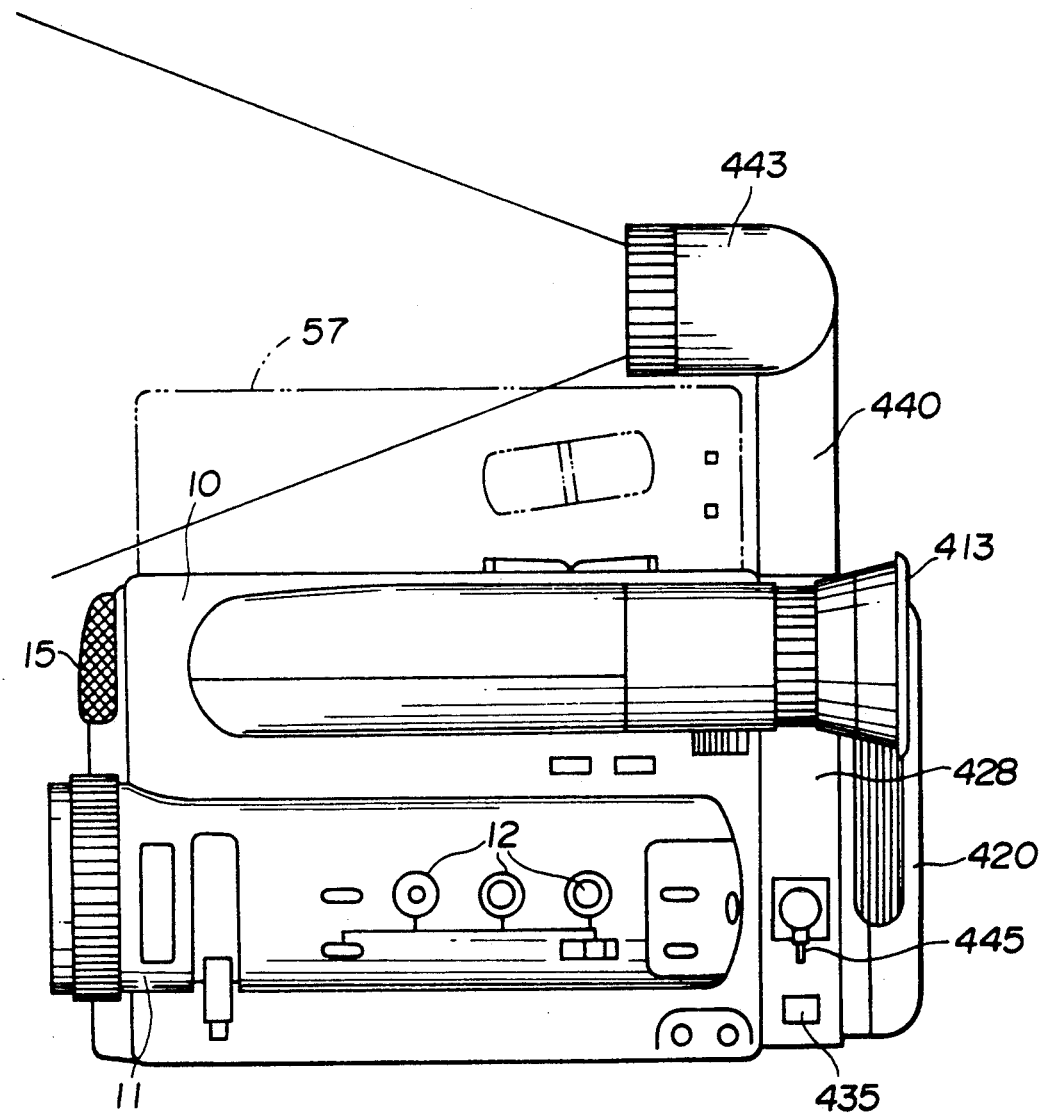
FIG. 13 is a side elevation showing a fourth embodiment of the present invention wherein a lamp is mounted on a telescopic member which is illustrated in an extended state.
Figure 14:
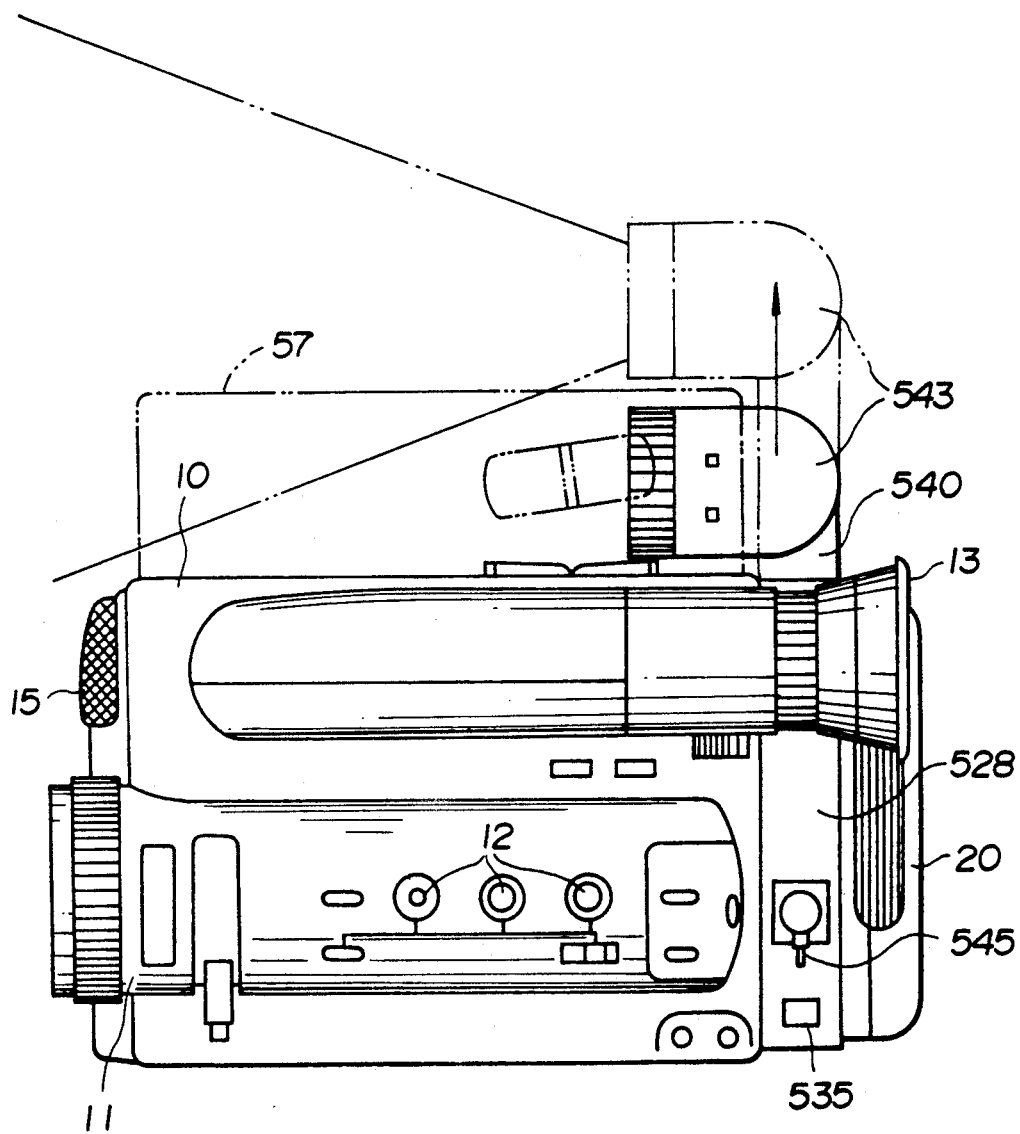
FIG. 14 is a side elevation of the fourth embodiment showing the lamp in a fully retraced state.

FIGS. 13 and 14 show a fourth embodiment of the present invention. This embodiment is a variant of the third one and features the arrangement wherein the support arm 440 is fixedly mounted on the main body of the light adapter pack 428 and arranged to support a lamp 443 at the top thereof. As shown in FIG. 13 the arm is arranged to be sufficiently long as to avoid interference with the cover 57 of the video camera which must be opened in order to permit cassette loading/unloading to be readily carried out.

This embodiment features simplified construction and cost. Further, the lamp is arranged sufficiently high so as to avoid casting a shadow of the forward portion of the video camera when in use indoors.

FURTHER EMBODIMENTS

FIG. 14 shows a further variant of the above type of light adapter pack wherein the support arm 540 is telescopic and the lamp 543 can be manually raised and lowered as desired.

Figure 15:
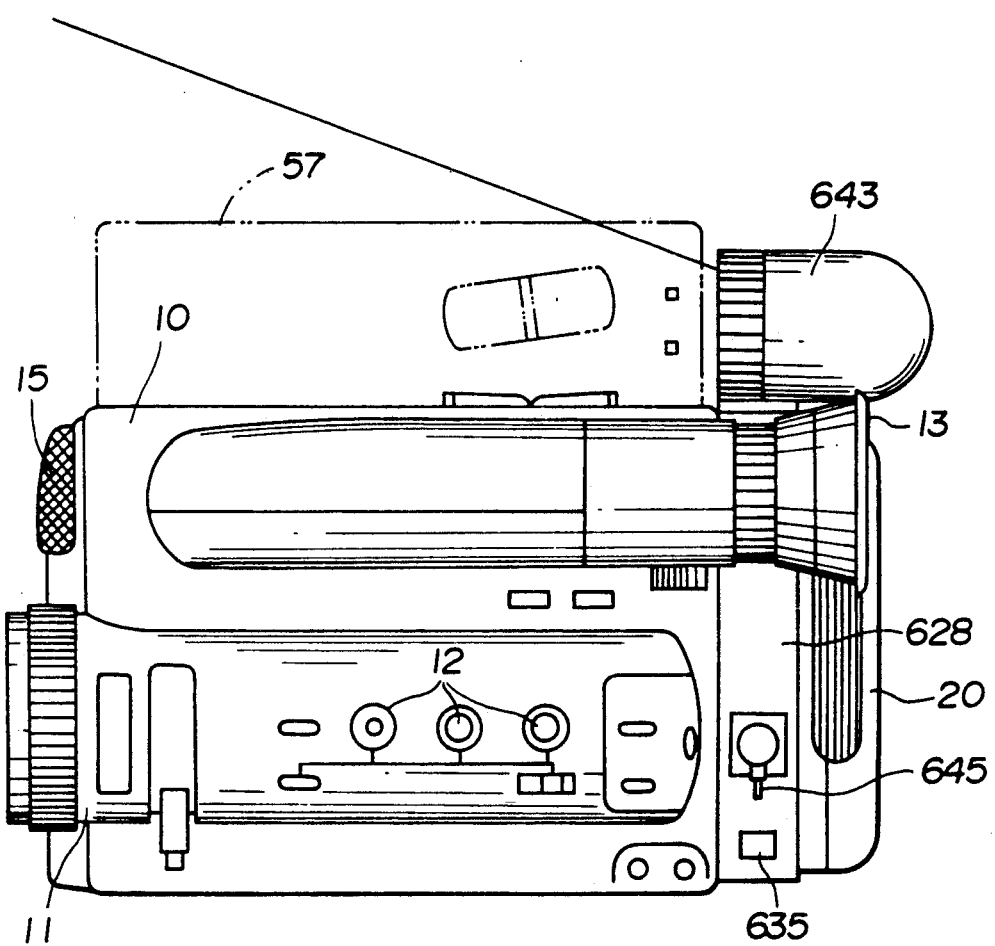
FIG. 15 is a side elevation showing a fifth embodiment of the invention.

FIG. 15 shows a further design variant wherein the lamp 643 is set back on the body of the light adapter pack body so as to provide both a low profile and to avoid interference with the cover 57 via which cassettes are loaded and unloaded.

FIGS. 16 to 18 show another embodiment of the invention wherein the sides of the pack are provided with recesses 759 via which a lamp enclosure 743 can be raised and lowered. A pin 760 is provided to selectively release the enclosure 743 and allow the same to be raised to an operative position or slid down into a storage position. This embodiment like the preceding ones can be used independently as a hand held flashlight if so desired.

As will be appreciated the above embodiments of the invention are such as to obviate the need for an unsightly accessory shoe and multiple power sources while readily allowing one or more accessory packs to be snapped into place at the rear of the video camera and powered by a signal battery pack which is snapped on at one end of the "sandwich". The mounting sites on the camera and each of the packs enables power from the battery pack to be supplied through to the camera and to the pack(s) along the way. Inputs to the camera or controls from the camera to the packs is enabled via suitable connector cables and plugs/jacks.

What is claimed is:

1. In a video camera including a cabinet in which a VTR system is housed and wherein said cabinet has a first battery mounting site on which a battery pack can be connected in a manner which enables electrical power to be supplied from the battery pack to the video camera and said video camera is adapted to receive a cassette in which a magnetic tape is housed, said video camera being arranged to record signals on the magnetic tape, the arrangement comprising:

a removable adapter pack having a tuner unit, said adapter pack being adapted for connection to the first battery mounting site, wherein said adapter pack has a second mounting site on which the battery pack can be mounted and permits electrical power from the battery pack mounted on the second mounting site to be supplied therethrough to the camera via the first mounting site in a manner wherein both the camera and the adapter pack can be operated on the single battery pack, and wherein said adapter pack permits electrical signals from said tuner unit to be supplied to the camera via the first mounting site for recording on said tape.

2. A video camera as claimed in claim 1 wherein said tuner unit includes a TV tuner unit.

3. A video camera as claimed in claim 1 wherein said tuner unit includes a FM tuner unit.

4. A video camera as claimed in claim 1 wherein said tuner unit provides electrical signals for recording on said tape in conjunction with electrical signals received from said video camera itself.

* * * * *